Sept. 13, 1927.  C. G. HALL  1,642,200
DISPENSING APPARATUS
Filed Jan. 14, 1925  4 Sheets-Sheet 3

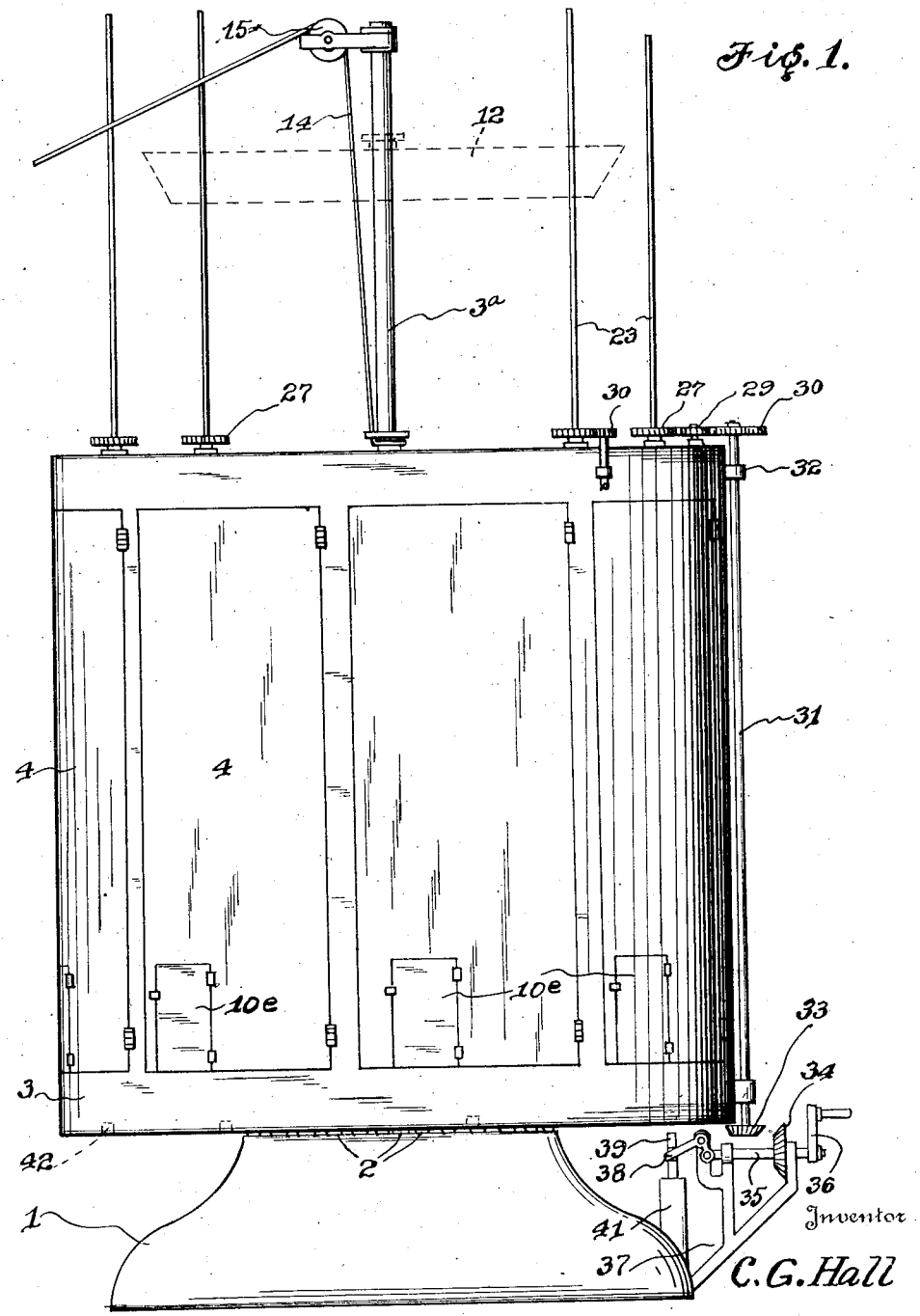

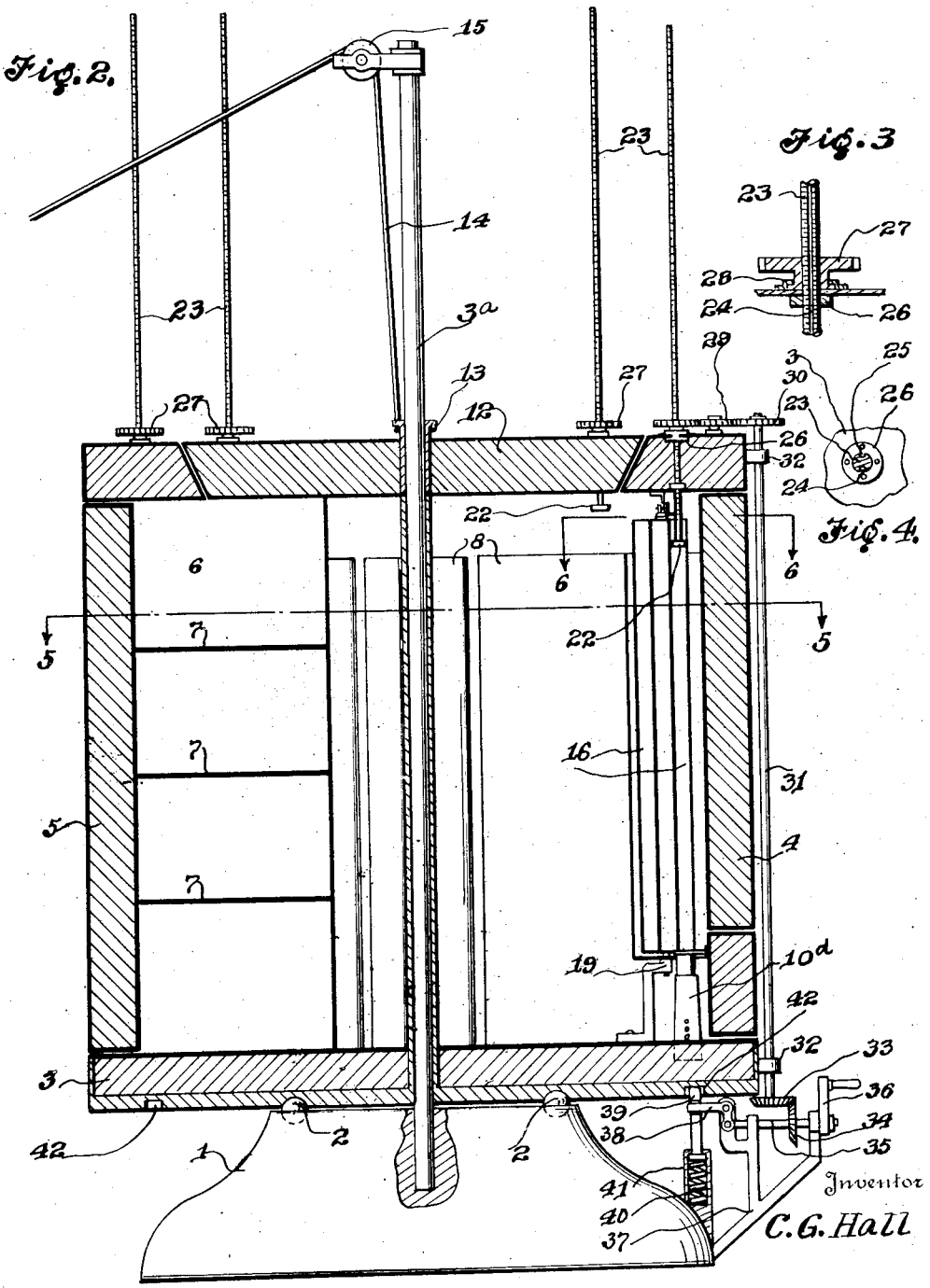

Inventor
C. G. Hall
By R. J. Bassett
Attorney

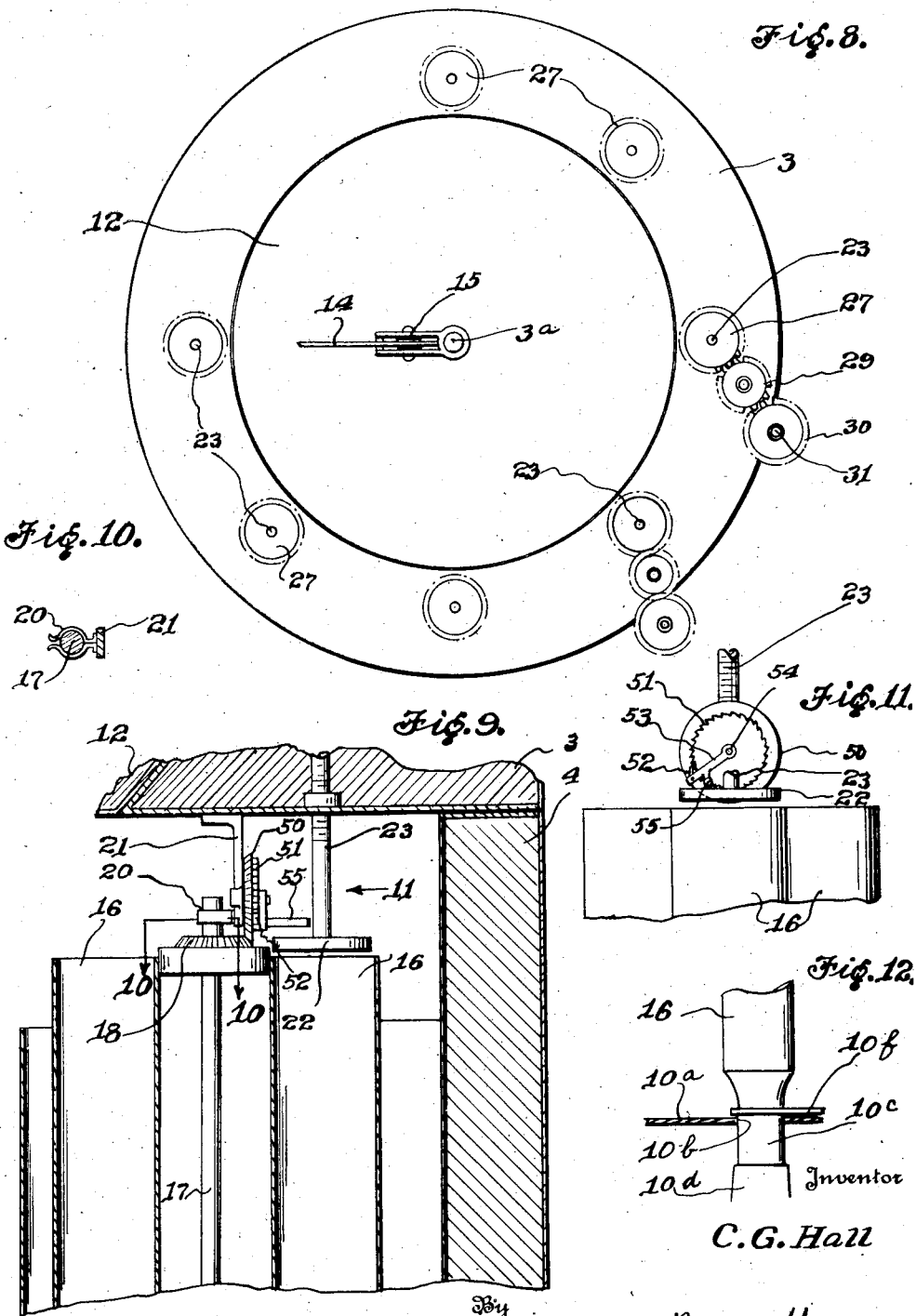

Patented Sept. 13, 1927.

1,642,200

UNITED STATES PATENT OFFICE.

CHARLES G. HALL, OF BOISE, IDAHO, ASSIGNOR TO NOVELTY FOOD CORPORATION, OF BOISE, IDAHO, A CORPORATION OF IDAHO.

DISPENSING APPARATUS.

Application filed January 14, 1925. Serial No. 2,308.

This invention relates to improvements in dispensing apparatus for vending various commodities, and more particularly to a novel apparatus for dispensing semi-solid substances, such as ice cream.

The primary object of the invention is to provide a dispensing machine in which the commodity is arranged in a tube, means being provided for exerting pressure at the upper end of the tube to force the material into a container at the lower end of the tube.

Another object of the invention is to provide a machine of this character in which each tube forms a part of a cluster of similar tubes, means being provided for rotating the cluster of tubes, to bring a desired tube into position to permit its contents to be acted upon by the force-exerting means or plunger. With such a structure, ice cream of one flavor may occupy one tube while cream of a different flavor may occupy a second tube of the cluster, etc. Therefore, with the use of the present invention, ice cream or the like of various flavors may be forced as layers into a single container.

A further object of the invention is to provide an apparatus of this character with storage chambers adapted to contain several clusters of filled or emptied tubes, the filled ones being transferable to a position in the apparatus where they are acted upon by the plunger.

A further object of the invention is to provide in such an apparatus, a rotatable casing, and means for locking the casing in various positions to permit the contents to be discharged from tubes in a plurality of clusters.

With the foregoing objects outlined and with other objects in view which will appear as the description proceeds, the invention consists in the novel features hereinafter described in detail, illustrated in the accompanying drawings, and more particularly pointed out in the appended claims.

Referring to the drawings:—

Fig. 1 is an elevation of the apparatus.

Fig. 2 is a vertical sectional view of the same taken on line 2—2 of Fig. 5.

Fig. 3 is a sectional view of a detail.

Fig. 4 is a horizontal sectional view of the same detail.

Fig. 8 is a top plan view with certain parts omitted to facilitate illustration.

Fig. 9 is a vertical sectional view of a detail illustrating the manner in which one of the ejecting plungers rotates a cluster of tubes.

Fig. 10 is a sectional view taken on line 10—10 of Fig. 9.

Fig. 11 is a view of part of the mechanism shown in Fig. 9 looking in the direction of the arrow 11.

Fig. 12 is a detail view showing the lower end of one of the tubes and a container to receive material from the tube.

Figure 5:
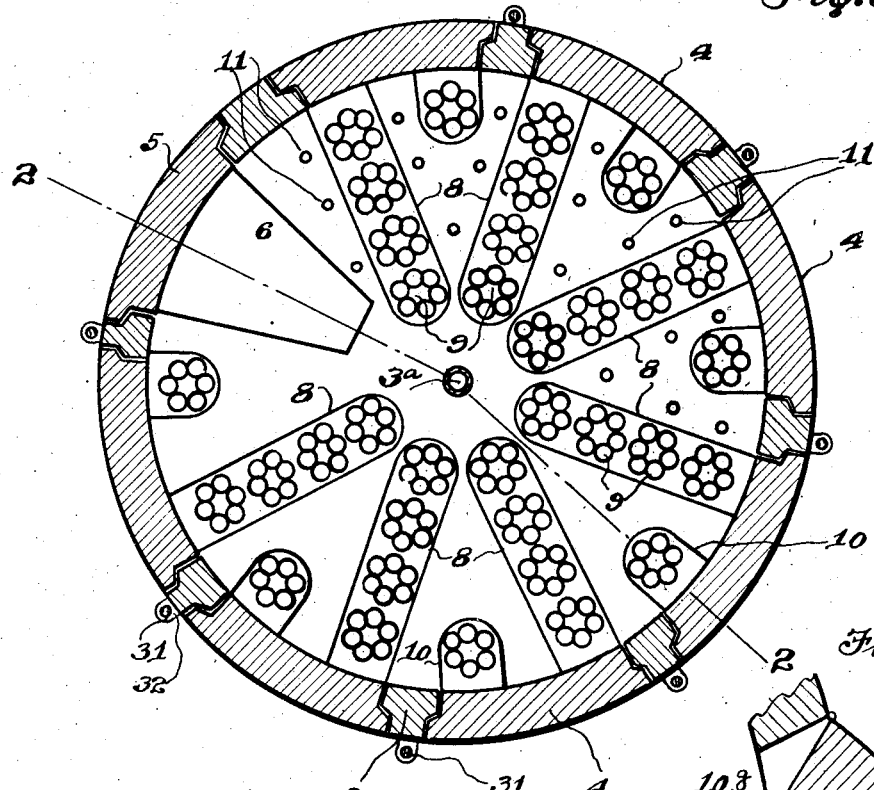
Fig. 5 is a horizontal sectional view taken on line 5—5 of Fig. 2.

In the drawing, 1 designates a pedestal carrying anti-friction balls 2 and a vertical shaft 3ᵃ.

Rotatably mounted on said shaft and resting on said balls, is a cylindrical casing 3 preferably made with double walls having insulating material between the same, in order to prevent the exterior temperature from affecting foods contained in the casing.

The wall of the casing contains a number of hinged doors 4 and 5, the latter acting as a door for a chamber 6, which has a number of shelves 7 to support blocks of ice cream or the like.

Arranged within the casing are several radially disposed receptacles 8 for the storage of filled or emptied clusters of tubes 9. The outer ends of these receptacles are accessible when the doors 4 are opened, and this will permit the operator to insert tube clusters into the receptacles or to remove such clusters from the receptacles.

Also arranged in the casing between the receptacles 8 are compartments 10, each of a size to hold only a single cluster of tubes.

The space within the casing, between the receptacles 8 and compartments 10 may be cooled by means of brine pipes 11, or by placing ice within the casing, or if desired, both of these cooling means may be used. To facilitate the introduction of ice into the casing, the top of the latter is provided with an opening closed by a lid 12 having a central hub 13 connected by a rope 14 passing over a pulley 15 at the upper end of the shaft 3ª. Obviously, the lid will raise when the rope is pulled.

Figure 6:
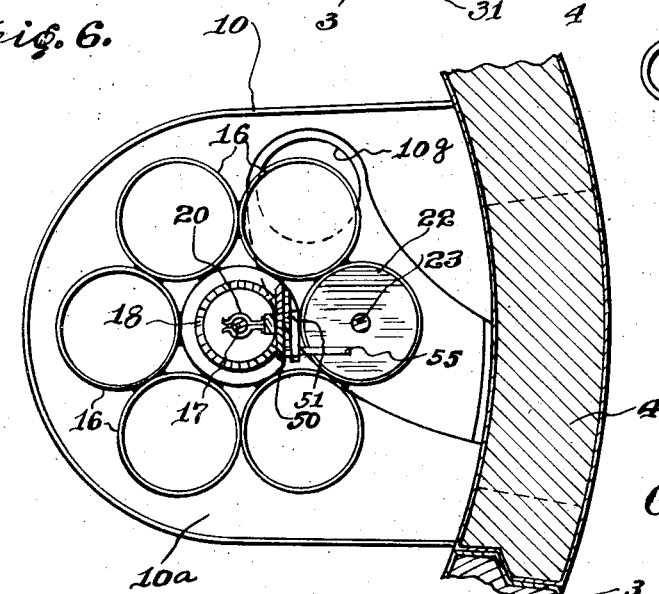
Fig. 6 is an enlarged horizontal sectional view of a detail taken on line 6—6 of Fig. 2.

Each cluster of tubes 9 as best shown in Figs. 6 and 9, consists of a number of tubes 16 assembled around a central shaft 17 which carries near its upper end a beveled gear 18. By opening one of the doors 4, a cluster of tubes containing the substance to be dispensed, may be introduced into one of the compartments 10, and in this operation the lower end of its shaft 17 will be set in a bearing 19 supported by the bottom of the casing 3, while the upper end of the shaft will be introduced between the jaws 20 of a spring clasp which is carried by a bracket 21 depending from the top of the casing. Now the cluster of tubes is in position to be acted upon by the ejector plunger 22 associated with the compartment in which the cluster has been inserted. There is the same number of plungers 22 in the apparatus as there are compartments 10 and each one of these plungers has an upwardly extending screw-threaded rod 23 that extends through the top of the casing.

As best shown in Figs. 2, 3 and 4, each rod has grooves 24 at its sides, which receive lugs 25 forming part of a plate 26 fixed on the top of the casing 3. Due to this construction, the rod may be raised and lowered but it cannot be turned. Each rod has an internally threaded gear 27 provided with a flange at its lower end that is rotatable in a socket 28 fixed to the top of the casing. Due to this construction, the rod 23 will be raised or lowered when the gear 27 is rotated. For the purpose of rotating the gears 27, each of these gears meshes with an idle gear 29 that is in turn rotated by a gear 30 on a shaft 31, which is mounted in bearings 32 on the side of the casing. The apparatus has the same number of shafts 31 as there are plunger rods 23, but for the purpose of illustration, only one of the shafts 31 is shown in Figs. 1 and 2. From these figures it may be seen that the shaft 31 has a gear 33 at its lower end adapted to mesh with a similar gear 34 fixed on an axially movable shaft 35 that is provided at its outer end with a hand crank 36. The shaft 35 is rotatably mounted in a bracket 37 and the inner end of the shaft is pivotally connected to a bell crank lever 38 that actuates a latch pin 39, which is normally pressed upward by a spring 40 arranged in a tube 41 on the pedestal 1. A single latch pin only is necessary to lock the casing 3 in the various positions to which it has been turned and in either position, the pin extends into a recess 42 in the bottom of the casing. Each shaft 31 will have a gear 33 and when this gear is out of mesh with the gear 34, as shown in Figure 1, the casing 3 may be rotated to bring the gear 33 of an adjacent compartment 10 into position to be actuated by the crank 36. From Fig. 2, it may be seen that when the parts are properly positioned, the latch pin will lock the casing against rotation and the gear 34 will be in position to rotate the gear 33. Then when the hand crank is turned the parts 31, 30, 29, 27 will be rotated and the plunger 22 will be forced downwardly into one of the tubes of a cluster to force material from the lower end of this tube.

As best shown in Figs. 2, 6 and 12, the compartment 10 has a bottom 10ª which normally prevents material from any of the tubes in the cluster, with the exception of the tube that is coaxial with the plunger 22, from moving downwardly. The bottom 10ª has an opening 10ᵇ coaxial with the plunger 22, so that the substance in the tube acted upon may be forced downwardly into a container 10ᶜ, which may rest on a support 10ᵈ. This support may be vertically adjusted in any suitable manner to accommodate containers of various sizes.

Figure 7:
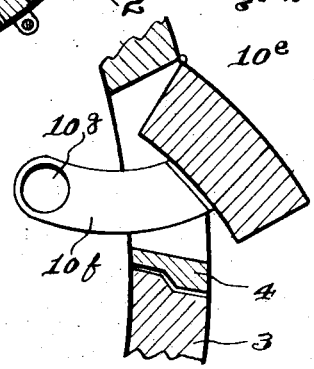
Fig. 7 is a horizontal sectional view of a detail illustrating one of the small doors of the apparatus and the manner in which a scraper on this door works.

To permit a container 10ᶜ to be placed on or removed from its position on the support 10ᵈ, each of the doors 4 is provided with a smaller door 10ᵉ, and this door, as best shown in Figs. 2, 6 and 7, carries a cut-off device or scraper 10ᶠ which slides over the bottom 10ª. When the small door 10ᵉ is closed, its scraper 10ᶠ will close the opening 10ᵇ in the bottom 10ª, but when the small door is swung partly open, as shown in Fig. 7, an opening 10ᵍ in the scraper will register with the opening 10ᵇ to permit material to be forced from the tube occupied by the plunger.

Attention is now directed to Figs. 6, 9 and 11, in order to point out that before or after a tube is emptied, the cluster may be rotated to bring another one of the tubes into position to be acted upon by the plunger. This will be useful in serving materials of different characters, for instance, ice cream of various flavors from a single cluster of tubes. This mechanism is also useful in rotating the cluster to bring a fresh tube into position after another one of the tubes has been emptied. It may be seen that the bracket 21 carries an idle bevel gear 50 which meshes with the gear 18. The gear 50 has fixed to it a ratchet wheel 51 that is engaged by a pawl 52 carried by an arm 53 which which swings about the shaft 54 on which the gear 50 is mounted. The arm has a projection 55 that extends over the plunger 22. Therefore, when the plunger is raised, it will lift the arm 55 and this arm will cause the ratchet mechanism to turn the gears 50 and 18 a sufficient distance to bring an adjacent tube into position to be acted upon by the plunger 22.

From the foregoing it is believed that the construction, operation and advantages of the invention may be readily understood by those skilled in the art, and it is apparent that changes may be made in the details disclosed without departing from the spirit of the invention as expressed in the claims.

What is claimed and desired to be secured by Letters-Patent is:

1. A dispensing apparatus including a casing having a bottom, a support in the casing projecting upwardly from said bottom and adapted to support a container while the latter is receiving material to be dispensed, a tube in the casing arranged above said support and having its lower end opened, a doorway in the casing to permit a container to be placed on or to be removed from the support, a door for closing said doorway, a single plate mounted on said door and arranged to close the lower end of the tube and to cut off material discharged from the tube, and a plunger movable in said tube.

2. In a dispensing apparatus, a rotatable casing containing a plurality of clusters of tubes adapted to contain the material to be dispensed, a single plunger for each cluster of tubes, a shaft operatively connected to each plunger for raising and lowering the latter, the plunger in its descending movement being adapted to force the material from one of the tubes, each shaft having a driven element, a second shaft having a stationary axis, and a driving element mounted on the second shaft and adapted to engage each of said driven elements for independently rotating each of the first mentioned shafts.

3. A dispensing apparatus, as claimed in claim 2 including a latching device for locking the casing against rotation, and means operatively connecting said latching device with the second shaft, whereby the latching device may be controlled by said second shaft.

4. A dispensing apparatus as claimed in claim 2 including a latch pin for locking the casing against rotation when desired, a bell crank lever connected to the latch pin, and means pivotally connecting the bell-crank lever to the second shaft.

5. A dispensing apparatus including a casing, a receptacle mounted in the casing and having an aperture in its bottom, a cluster of tubes rotatably mounted in the receptacle, a single axially movable plunger adapted to enter and eject material from each tube of the cluster, and means actuated by said plunger for rotating the cluster of tubes.

6. A dispensing apparatus including a rotatable shaft, a cluster of tubes mounted on and rotatable with said shaft, a single plunger adapted to work in each of said tubes for ejecting material from the same, and means actuated by the plunger for rotating the shaft and the cluster of tubes.

7. In a dispensing apparatus, a casing, a shaft rotatably mounted in the casing, a cluster of tubes carried by the shaft, an axially movable plunger arranged in the casing and adapted to eject material from each of said tubes, gearing connected to said shaft, and ratchet mechanism engageable with the plunger for causing the latter to turn the shaft when the plunger is moved in one direction.

8. A dispensing apparatus including a casing, a number of storage receptacles arranged in the casing, a number of compartments in the casing between said receptacles, a cluster of tubes arranged in each compartment, and means associated with each compartment for ejecting material from the tubes in said compartment.

9. A dispensing apparatus including a base, a casing rotatably mounted on said base, a number of clusters of tubes arranged in the casing, each cluster being rotatable, a single plunger for each cluster for forcing material from the tubes of each cluster, an actuating member for each plunger, and a single actuating device for operating each of said actuating members.

In testimony whereof I hereunto affix my signature.

CHARLES G. HALL.